Feb. 15, 1927.
J. KERO
BARK CUTTER AND PEELER
Filed Sept. 2, 1925
1,617,953
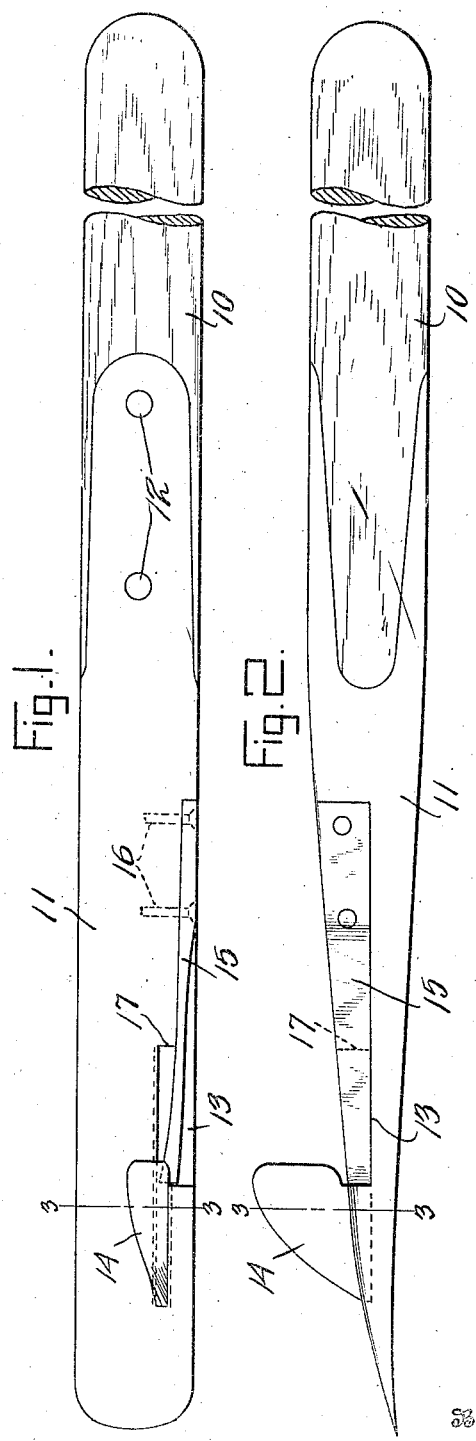
Inventor
Jacob Kero Patented Feb. 15, 1927.

1,617,953

UNITED STATES PATENT OFFICE.

JACOB KERO, OF SAXON, WISCONSIN.

BARK CUTTER AND PEELER.

Application filed September 2, 1925. Serial No. 54,157.

My said invention relates to a bark cutter and peeler and it is an object thereof to provide a device of this character which is efficient in operation and can be cheaply constructed, the parts that wear out first being readily renewable.

Referring to the accompanying drawings which are made a part hereof and on which similar reference characters indicate similar parts, Figure 1 is a bottom plan view, Figure 2, a side elevation, and Figure 3, a section on line 3—3 of Figures 1 and 2.

Reference character 10 indicates a wooden handle for the device, said handle being of convenient length as for example about 26 inches. The peeling blade 11 is secured to the handle by rivets 12, this peeling blade being preferably made of a single piece of steel and having a thin edge at its forward end for insection under the bark of trees.

A notch is formed at one side of the blade, as indicated at 13, this notch extending forward and being approximately V-shaped at the forward part as indicated in Fig. 3 for the reception of the flared or dovetailed base of a cutting blade 14. The blade is of substantial width and extends downward from the under side of the peeler about one inch, said blade being inclined to the left when the implement is viewed from the forward sharp end.

A piece of spring metal 15 is secured to the peeler blade at one side by means of screws 16 which have their heads countersunk in the spring. This spring is set in sufficiently so that its outer surface registers with that of the peeler blade to avoid injury to the hands of the user. At its forward end the spring is bent inward so as to rest against the rear end of the cutter blade 14 and hold the same securely in place. It will be obvious that the spring can be bent outwardly at its forward end so that the cutter blade can be slid back against the shoulder 17, when the cutter blade can readily be removed.

In the use of my device the cutter blade is drawn across the body of a tree to cut across the bark and may also be moved lengthwise of the body of the tree for loosening the bark to permit the peeler blade to enter beneath the same. Thereafter the peeler blade is inserted under the bark and is moved upward and sidewise to loosen the bark in strips as for use in tanning etc.

It will be obvious to those skilled in the art that various changes may be made in my device without departing from the spirit of the invention and therefore I do not limit myself to what is shown in the drawing and described in the specification but only as indicated in the appended claims.

Having thus fully described my said invention, what I claim as new and desire to secure by Letters Patent, is:

1. A bark cutter and peeler comprising a peeler blade having a thin forward edge of substantial width, a notch at the under side of the peeler blade said notch being undercut at its forward end, a cutter-blade having a dove-tailed base fitting in said undercut portion of the notch, and means to hold the blade in place, substantially as set forth.

2. A bark cutter and peeler comprising a peeler blade having a thin forward edge of substantial width, a notch at the under side of the peeler blade said notch being undercut at its forward end, a cutter-blade with a dovetailed base fitting in said undercut portion of the notch, and a steel spring having a free end normally adjacent the base of the blade for holding it in place, substantially as set forth.

3. A bark cutter and peeler having a peeling blade with a thin forward edge and a cutter blade mounted on the under face thereof, said cutter blade being inclined with reference to its base and toward one side of the peeler blade and having the extremity of its cutting edge disposed over the intermediate portion of the side on which it is mounted, substantially as set forth.

4. A bark cutter and peeler comprising a peeler blade having a thin forward edge of substantial width, an elongated socket in the underside of the peeler blade, a cutter blade fitting in said elongated socket, and means for holding said blade in place, substantially as set forth.

5. A bark cutter and peeler comprising a peeler blade having a thin forward edge, a socket in the underside of the peeler blade, and a cutter blade rigidly mounted in said socket, substantially as set forth.

6. A bark cutter and peeler comprising a handle having its forward extremity curved terminating in a thin flattened peeler blade, and a cutter blade rigidly mounted on the under side of said peeler blade, substantially as set forth.

In witness whereof, I have hereunto set my hand and seal at Duluth, Minnesota, this 29th day of August, A. D. nineteen hundred and twenty-five.

JACOB KERO. [L. S.]